Figure 2:
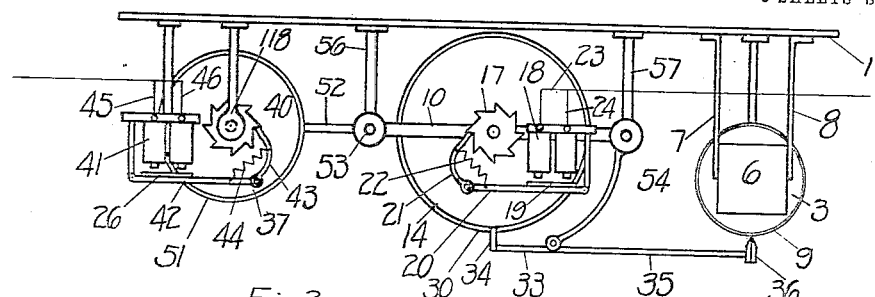

H. C. ALGER.
RECORDER.
APPLICATION FILED OCT. 21, 1912.

1,130,954.

Patented Mar. 9, 1915.

3 SHEETS—SHEET 1.

WITNESSES
James J. Hunt.
Irvin E. Dischinger.

INVENTOR
Harley C. Alger

H. C. ALGER.
RECORDER.
APPLICATION FILED OCT. 21, 1912.

1,130,954.

Patented Mar. 9, 1915.
3 SHEETS—SHEET 3.

WITNESSES
James J. Hunt.

INVENTOR
Harley C. Alger

UNITED STATES PATENT OFFICE.

HARLEY C. ALGER, OF CHICAGO HEIGHTS, ILLINOIS.

RECORDER.

1,130,954. Specification of Letters Patent. Patented Mar. 9, 1915.

Application filed October 21, 1912. Serial No. 727,051.

*To all whom it may concern:*

Be it known that I, HARLEY C. ALGER, a citizen of the United States, residing at Chicago Heights, in the county of Cook and State of Illinois, have invented a new and useful Recorder, of which the following is a specification.

My invention relates to improvements in recorders in which a record or indication is made by a suitable recording element upon any suitable record sheet or indication receiving means, the object being to provide a recorder for indicating, registering or recording the performance of two or more variable factors in such a manner as to record the result of a mathematical calculation, such for example as the quotient obtained by dividing one factor by another factor, or the product obtained by the multiplication of factors, any or all of which factors may be variable.

The recorder may be constructed to record the result of a mathematical calculation for a number of different purposes, such as to record the weight of coal burned per horse-power hour in a power plant, the amount of ammonia produced per ton of coal consumed in a gas plant where ammonia is a by-product, the number of cubic feet of gas per ton of fuel consumed, the evaporation of boilers in pounds of water evaporated per pound of fuel burned, or like results. I have below described in detail the construction of such a device which may be used for recording evaporation of boilers and the like although I do not confine myself to the use of my invention for this purpose.

The invention consists in certain novel constructions which are described below and which will be more particularly pointed out in the claims.

The managers of many power plants to-day realize the advantage of having continuous and automatic records showing the performance of the power plant and among the most important items which may be recorded are the fuel which is burned and the water that this fuel converts into steam or the steam produced. Recorders have been made which record the flow of water or steam or which register the total amount of water passing through the pipe line such as the boiler feed line leading water to the boilers and recorders have also been made which automatically record or register the coal, gas, oil or other fuel used. A more important factor which is the result of the two factors just mentioned, is the evaporation, which may be defined as the quantity of water evaporated or the quantity of steam produced divided by the quantity of fuel burned and in obtaining this evaporation it has been necessary to obtain the amount of water evaporated or the quantity of steam produced in a given time from one recorder or register, the amount of fuel burned in this period from another recorder or register and then calculate the evaporation by dividing the amount of water evaporated by the amount of fuel burned. For example suppose that an engineer is conducting a test upon a boiler and that he wishes to know the evaporation up to that time so that he may have an indication of the progress of the test. Heretofore it has been necessary for him to obtain the weight of fuel consumed from a fuel meter or a record of weights if the weighing is done by hand and then to divide the former by the latter in order to obtain the weight of water evaporated per pound of fuel. It will be seen that my device does this automatically and gives a record of this division at all times so that a glance shows the evaporation thus giving a convenient record and doing away with the necessity of performing the calculation.

In my invention I have produced an apparatus which automatically and continuously makes such a division and which indicates, registers or records the quotient of the factors, which may be variable. The apparatus described may be used to record evaporation or it may also be used to record other mathematical results if desired. When used to record evaporation of boilers it is usually sufficient to record the actual evaporation which is the actual pounds of water evaporated or steam produced divided by the number of pounds of fuel burned for this purpose without regard to the temperature of the boiler feed water or the pressure under which the boilers are operating. In some cases it is desirable to reduce the actual evaporation to a common basis for comparison such as the equivalent evaporation from and at 212 degrees Fahrenheit which takes into account the temperature of the boiler feed water and the pressure under which the boilers are operating, in which case the actual evaporation should be multiplied by the so-called factor of evaporation to give the equivalent evaporation desired and in such cases I provide means for producing this result automatically.

Figure 1:
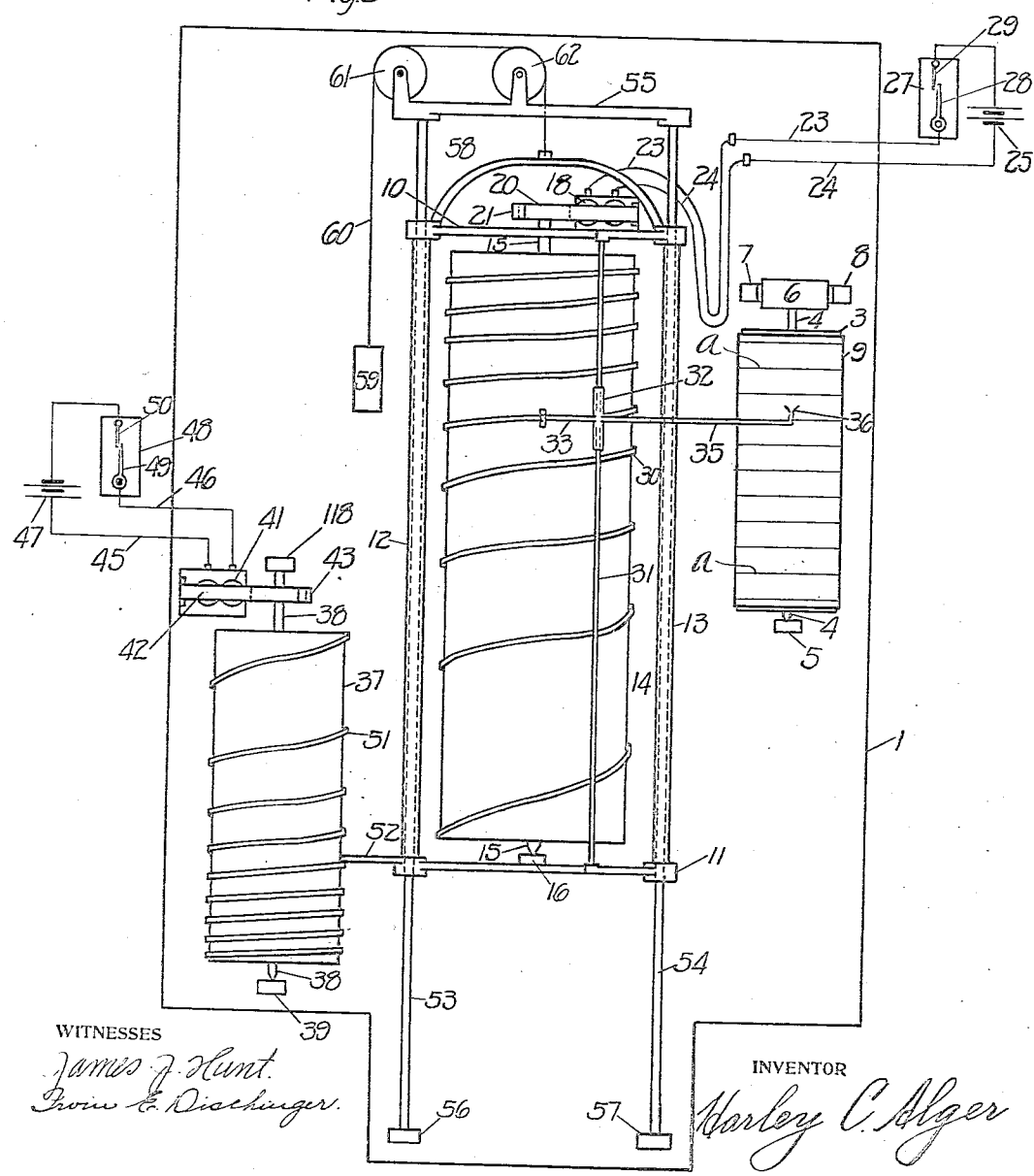
Figure 3:
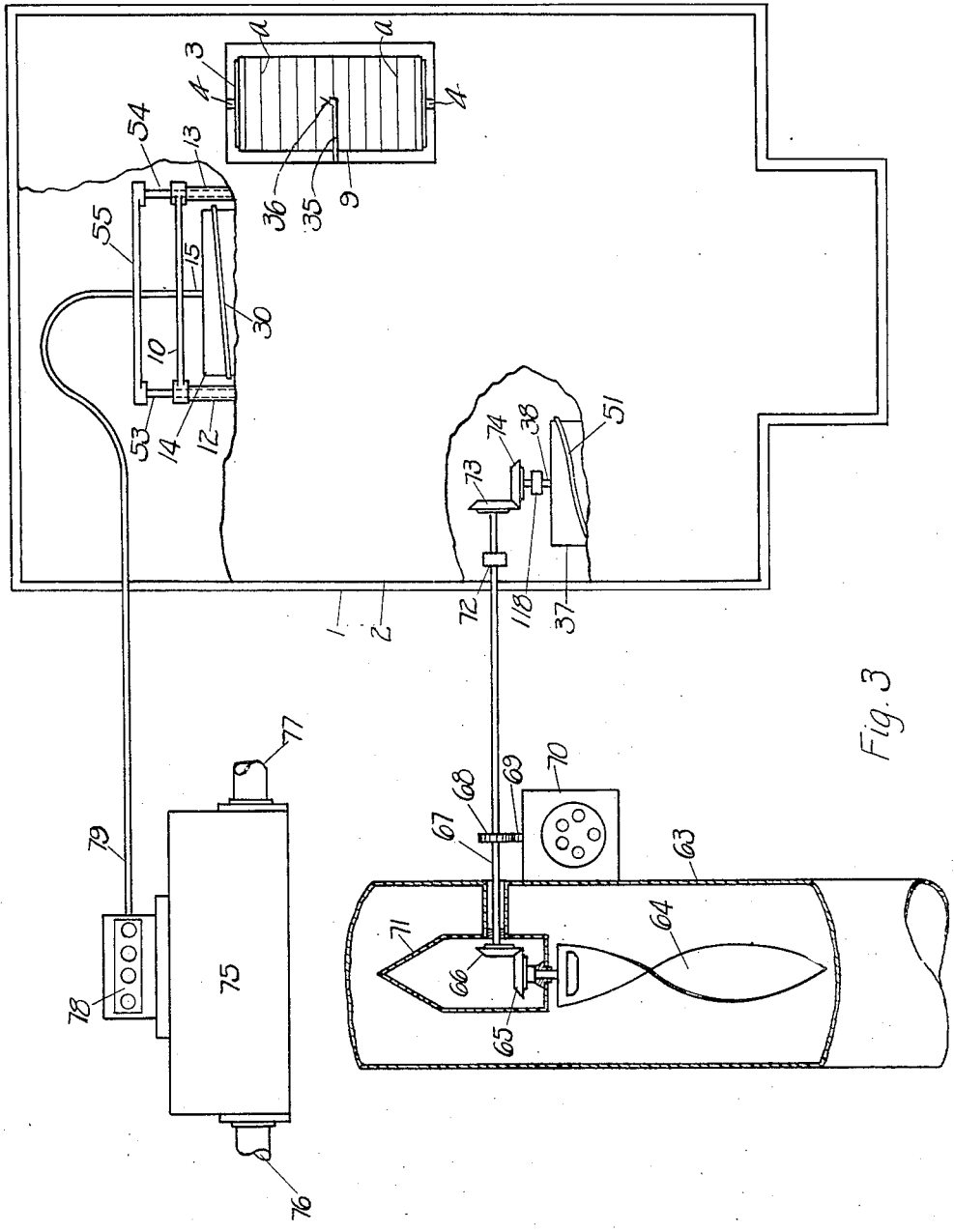
Figures 4, 5:
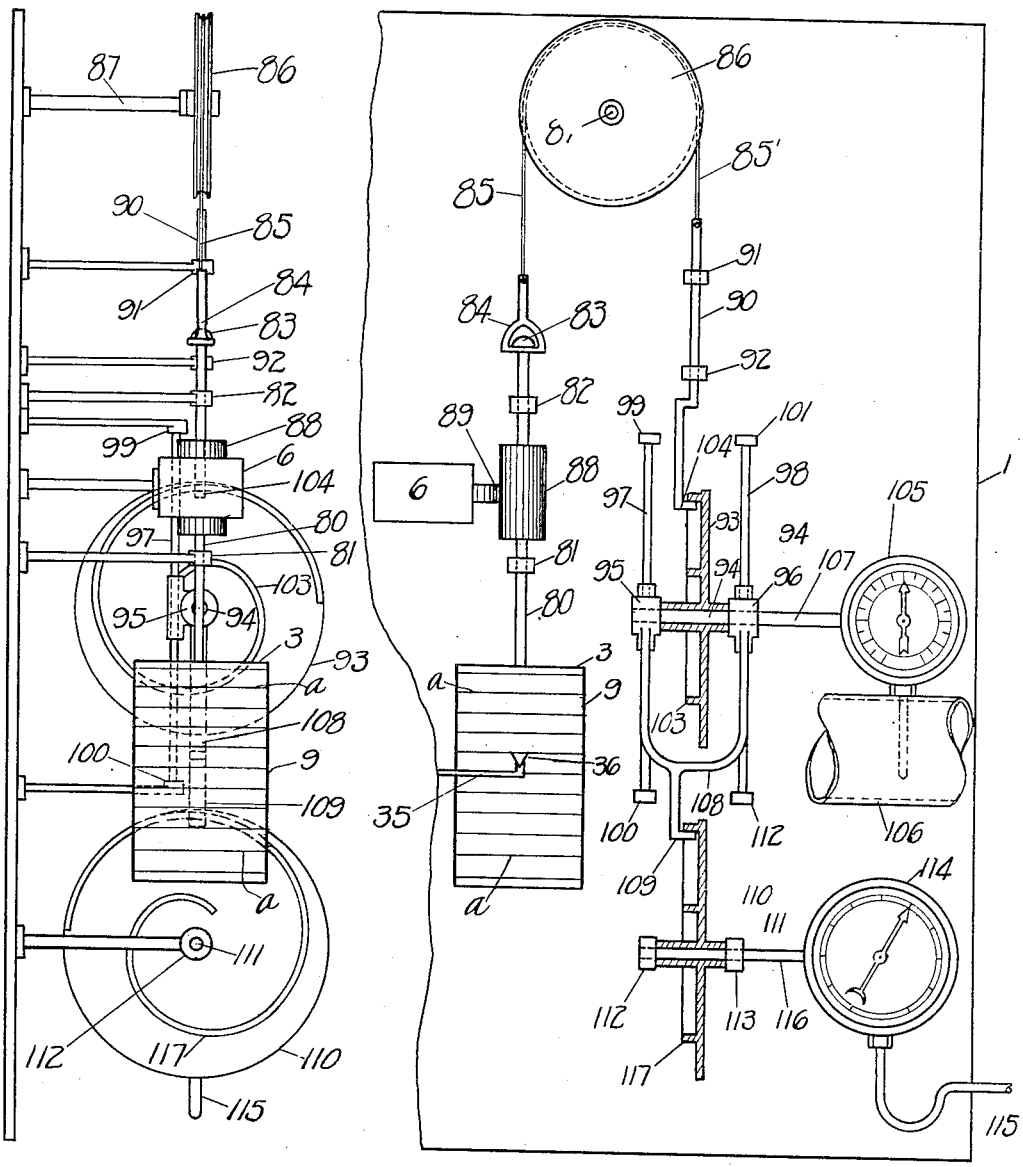

Figure 1 shows an elevation of my invention adapted to record actual evaporation; Fig. 2 shows a plan view of Fig. 1, a portion of the frame work of Fig. 1 being removed to better show the mechanism below; Fig. 3 shows a modification of the recorder in connection with a water meter and a coal meter; Fig. 4 shows a front elevation of a modification of my invention while Fig. 5 shows a side view of Fig. 4.

In Fig. 1, I have shown the mechanism as arranged to record actual evaporation, mounted on a suitable support 1. The mechanism is preferably inclosed in a case 2, Fig. 3 the mechanism being shown in Fig. 1 with the case 2 removed. Any of the many forms of indicating members such as a counter or register, a recording chart or a scale, may be used for indicating the evaporation. It is preferable in many cases, however, to employ a recording member operated by clockwork or similar mechanism and in Fig. 1 I have shown the indicating member of the recording type. This recording member which may be of the disk, drum or any other type desired, (a drum 3 being shown) is carried by suitable means such as a shaft 4, 4 which is rotatably mounted in a suitable bearing, 5. A suitable clockwork 6 carried by brackets 7 and 8 extending from the support 1 may be arranged to rotate the drum, 3 from one end of the shaft 4, 4. Upon the drum 3 may be mounted a chart 9 adapted to receive the record. A chart or record sheet 9, carried by the drum 3 may be graduated or may have divisions marked thereon which indicate the amount of the evaporation. A recording member may be provided for indicating or recording upon the chart 9 and such recording member may be made movable up and down. Any preferred form of record sheet may be employed or any other suitable means used to indicate the result which may preferably be shown upon a graduated member marked with figures or other notations. If a stationary scale is provided instead of a movable chart the result is indicated but not recorded, in which case a pointer may be used in the place of the pen 36 while if a chart driven by clockwork is used the result is not only indicated but is also recorded as the chart moves. Mechanism may then be provided which may be actuated by the action of a water meter or weigher or steam meter to cause the indicating member to rise as more water is fed to the boilers, thus indicating a higher value, while such mechanism may also be actuated by a fuel meter or weigher to cause the indicating member to lower thus indicating a lower value upon the chart 9. The indicating member will then be actuated in accordance with the amount of steam produced, but with constantly decreasing increments, to indicate a higher value and will be actuated in accordance with the amount of fuel consumed, with constantly decreasing increments, to indicate a lower value whereby the value actually indicated may represent the evaporation of the boilers. The recording member then tends to move in one direction in accordance with increase in value of one element or material delivered past a given point, while it also tends to move in the opposite direction in accordance with increase in value of another element or material delivered past a given point so that the recording member records a resultant of two motions which, by suitable proportioning of the mechanism, may be made to correspond to the evaporation, if desired. I do not confine myself to any particular construction or mechanism for producing this result but in the various drawings have shown mechanism which may be employed.

In Fig. 1 is shown a sliding framework or carriage comprising a suitably arranged top member 10 which may be secured to a suitable bottom member 11 by means of tubes 12 and 13, and which may carry a revoluble drum 14 having a shaft 15, 15 which may be rotatably mounted in a suitable bearing 16 carried by the bottom member 11. At one end of the shaft 15 is secured a ratchet wheel 17 and a suitably mounted electro-magnet 18 secured to top member 10 and having an armature 19 secured to a pivoted arm 20 operates through a pawl 21 to move the ratchet wheel 17 at intervals when an electric circuit through the electro-magnet 18 is closed. A suitable spring 22 in tension, secured to the arm 20 and pawl 21 holds the pawl 21 against the ratchet wheel 17. Wires 23 and 24 lead from the electro-magnet to a battery 25 or other source of electrical energy and to a contact maker comprising a base 27 with contact arms 28 and 29 which may be of flexible spring construction. The contact arm 28 is movable and may be suitably connected to a machine which registers or records one of the elements or one of the factors of the final quotient or product which it is desired to record upon the chart 9. For example, the movable contact arm 28 may be suitably connected to the registering device of a water meter so that the arm 28 makes contact with the arm 29 every time such water meter delivers a given quantity of water or a unit charge of water. The term meter is used throughout this specification and claims to broadly cover any means used to measure, weigh or otherwise obtain the quantity of the elements, whether solid, liquid, or gaseous which go to make up any of the factors of the final result which it is desired to record. Upon the drum 14 may be wound a wire 30. A rod 31 extending from the upper member 10 of the supporting frame work to the lower member 11, has a tube 32 slidingly mounted thereon. Extending from the tube 32 is an arm 33 carrying a fork or grooved extending piece 34 which is adapted to engage the wire 30 wound upon the cylinder 14. A suitable pen arm 35 is also carried by the sliding tube 32 and has a pen 36 which is adapted to record upon the revolving chart 9. A bracket 55 and brackets 56 and 57 held by the support 1 may carry rods 53 and 54 upon which the sliding tubes 12 and 13 are adapted to slide. The sliding frame work may then be moved up or down guided by the rods 53 and 54. If the sliding framework and the parts which it carries are heavy they may be counter balanced by a weight 59 connecting by means of a cord 60 which passes over suitable pulleys 61 and 62 secured to the bracket 55 with a yoke 58 which may be secured to the upper member 10 of the sliding framework.

The parts just described may be so balanced that when released the sliding framework will move downward, being held in position as will be later described. A drum 37 which may be of construction somewhat similar to the drum 14 is mounted on a shaft 38, 38 which is rotatably mounted in suitable bearings 39 and 118. A ratchet wheel 40 is secured at one end of the shaft 38 and a suitably mounted electro-magnet 41 operates through an arm 42 carrying an armature 26 and through a pawl 43 to turn the ratchet wheel 40. The pawl 43 is held against the ratchet wheel 40 by means of a spring 44 in tension, connected to the arm 42 and the pawl 43. Wires 45 and 46 lead from the electro-magnet to batteries 47 and a suitable contact maker comprising a suitable base 48 and contact arms 49 and 50. The contact arms 49 and 50 may be of flexible spring construction and the contact arm 49 may be movable and connected with a fuel meter so that it will make a contact thus closing the electrical circuit each time the fuel meter delivers a unit charge or a given quantity of fuel. A wire 51 may be wound upon the drum 37 and an arm 52 extending from the lower member 11 rests upon the wire 51 so that the sliding framework will be held in a position corresponding to the position of the arm 52 upon the wire 51. As the electric circuit is closed by contact arm 49 the electro-magnet 41 causes the drum 37 to revolve so that the sliding framework may lower each time a contact is made. This motion is transmitted through the sliding framework carrying the rod 31, sliding tube 32 and pen arm 35, causing the pen 36 to drop a corresponding amount on the recording chart 9. It will then be seen that the revoluble drum 14 operates to cause the pen 36 to record a higher value while the revoluble drum 37 operates to shift the sliding frame work and revoluble drum together with the pen and alter the relative position between the pen and the chart in the opposite direction so that a lower value is recorded. When a contact is made by the contact maker 26 due to the delivery of water by the water meter, the electrical circuit is closed through the wires 23 and 24 causing the electro-magnet 18 to draw down the armature 19 which operates through the arm 20 and pawl 21 to turn the ratchet wheel 17 thus revolving the drum 14 in a direction to cause the tube 32 to slide upward on the rod 31 carrying the pen arm 35 and causing the pen 36 to rise a corresponding amount. The pen 36 then records the result of two motions which may be in opposite directions and the unit charges of the fuel and water meters together with the pitch of the wire 51, wound on the drum 37, and the pitch of the wire 30 wound on the drum 14, may be such, that the pen 36 will record the quotient of the amount of water delivered, divided by the amount of fuel delivered, thus giving the evaporation in pounds of water per pound of coal. It is also evident that with the water weighing machine operating at intervals, causing the pen to move upward while between intervals the clockwork causes the pen to record a horizontal line there will be breaks in the line drawn on the chart 9 and lines showing movement upward on the chart caused by the drum 30 with its framework moving upward which will indicate each time the water meter delivers a unit charge of water, similarly vertical lines leading downward will show each time the fuel meter delivers a unit charge of fuel. The device will then show the evaporation at any given time and due to the breaks in the line will also show the performance of the water and coal meters separately. The slope, or varying pitch of the wires 30 and 51 may be determined by experiment but it is well to bear in mind that the slope of the wires should be in proportion to logarithms or that the vertical distances to the wires measured from a given base circle at equal intervals around the drum 3 should be in proportion to logarithms in order to give a record upon a chart having uniform graduations.

When the water meter and fuel meter are of such construction that they deliver water or fuel in a continuous stream and not in unit charges, connections may be made to operate the mechanism by electric contact which will produce the record with broken lines as just described or connections may be made to operate the mechanism continuously as shown in Fig. 3.

In Fig. 3 is shown a coal meter, which may be adapted for measuring and registering continuously the coal passing therethrough. Such a coal meter may comprise a tube or pipe 63 in which is mounted a screw or vane 64 adapted to operate through a pair of bevel gears 65 and 66, a shaft 67, and a suitable gear 68 secured to the shaft 67 may drive a gear 69 of a suitable counter or register, 70 which may be adapted to register the quantity of coal passing through the meter. A pointed member 71 may be used to cause the coal to diverge above the screw 64 and as the coal passes down through the pipe 63 it will cause the screw 64 to revolve and the register 70 may be so adjusted as to register the number of cubic feet or pounds of coal passing through the pipe 63. The shaft 67 suitably supported by a bearing 72 on the support 1, may extend from the coal meter and operate through suitable gears 73 and 74 to turn the drum 37, which will thus cause the sliding frame work to lower continuously and in proportion to the amount of coal being delivered. In Fig. 3 is also shown a water meter 75 having a suitable inlet 76 and outlet 77 and a register 78 for indicating the amount of water passing therethrough. A shaft 79 suitably connected with the registering mechanism 78 may extend from the water meter. The shaft 79 may be of flexible construction and adapted to connect with the shaft 15 of the revoluble drum 14. The shaft 79 being flexible will allow the sliding framework carrying the drum 14 to move up and down while at the same time causing the drum 14 to revolve and in proportion to the amount of water passing through the water meter. The proportions of the gearing of the coal meter and of the mechanism driving the shaft 79, together with the pitch of the wires wound on the revoluble drums 14 and 37 may be made such that the pen will record the resultant evaporation upon the chart 9 as previously described.

The apparatus as above described is intended to record the actual evaporation and as above mentioned my invention may also be adapted to record the equivalent evaporation which takes into account the temperature of the feed water and the pressure under which the boilers are operating. In Figs. 4 and 5, are shown modifications of my invention adapted for this purpose. In this case the drum 3 carrying the recording chart 9 may be carried by a suitable shaft 80 which is slidingly received in bearings 81 and 82 which may be carried by the support 1. The shaft 80 has an enlarged head 83, rotatably held by an eye 84 which may be suspended from a cord 85, 85' passing over a pulley 86 rotatably mounted on a shaft 87 carried by the support 1. The enlarged head 83 allows the shaft 80 to turn as the shaft 80 may be moved longitudinally. The shaft 80 carries a gear 88 with relatively long face which meshes with a gear 89 suitably connected to the clockwork 6 so that the clockwork 6 operates through the gears 89 and 88 and shaft 80 to turn the drum 3 while at the same time the drum may be moved up or down, thus altering the relative position of the pen 36 on the chart 9 causing the pen 36 to record a slightly different value in proportion to the amount which the drum 3 is raised or lowered. Connected to the end 85' of the cord passing over the pulley 86 is a sliding bar 90 slidingly received in guides 91 and 92 secured to the support 1. Suitable means may be provided for automatically raising or lowering the drum 3 thus altering the value of the record being made by the pen 36 in accordance with changes in temperature of the boiler feed water or changes in pressure under which the boilers are operating. In cases where the temperature is constant but the pressure varies, means may be provided operated by the pressure alone causing movement of the drum 3 to bring about the desired results. In cases where the pressure is constant and the temperature of the boiler feed water changes, means may be provided to alter the record of the pen 36 upon the chart 9 in accordance with the variation in change of temperature. In Figs. 4 and 5, I have shown mechanisms which may be used for these purposes. A disk 93 may be suitably mounted upon and secured to a shaft 94 journaled in bearings 95 and 96. The bearings 95 and 96 are adapted to slide upon rods 97 and 98 carried by brackets 99, 100, 101, and 102 secured to the support 1, so that the disk 93 may be given an up and down movement while at the same time rotating; a wire or projection 103 spirally wound may be secured to the face of the disk 93 and the sliding shaft 90 may have an extending finger 104 adapted to engage the wire 103. Connected to a suitable thermometer 105 which may be adapted to indicate the temperature of the water passing through a pipe 106 which may lead to the boilers, is a shaft 107 extending therefrom connected to the shaft 94 and adapted to rotate the disk 93 thus causing the extending finger 104 which engages the spirally wound wire 103 to be moved up or down thereby moving the recording drum 3. It is to be understood that the weight of the parts suspended from the end 85 of the cord is sufficient to hold the extending finger 104 against the wire 103 at all times. The proportions of the various parts and the shape of the spirally wound wire 103 may be such that the recording drum 3 will be moved thereby altering the record so that it will automatically vary in accordance with changes in temperature and the connections should be such that the drum 3 will lower causing an increase in the value of the evaporation as recorded on the chart 9 as the temperature in the boiler feed line 106 decreases. The shaft 107 may be of a flexible construction so that it will allow the disk 93 to move up or down while being rotated. A revoluble disk 110 may be mounted upon and secured to a shaft 111 suitably journaled in bearings 112 and 113 held by the support 1. A suitable gage 114 connected to the boilers through a pipe 115 may be used to indicate the pressure within the boilers and a suitable shaft 116 may extend from the gage 114 and be secured to the shaft 111 so as to rotate the disk 110 as the pressure within the boilers changes. Upon the disk 110 is formed a spirally wound wire or projection 117. A yoke 108 may be secured to the bearings 95 and 96 and may have a finger 109 extending therefrom and adapted to engage the spirally wound wire 117 so that motion may be transmitted through the extending finger 109, yoke 108, to the sliding bearings 95 and 96 causing the disk 93 to be moved up or down allowing the sliding bar 90 to move up or down which causes the drum 3 to lower or rise. The proportions of the parts of the gage 114 and the shape of the spirally wound wire 117 may be such that the drum 3 will be lowered, thus causing a corresponding higher value to be recorded upon the recording chart 9 as the pressure within the boilers rises. With the two revoluble disks 93 and 110 operating as described, a motion will be given to the drum 3 corresponding to the temperature of the water being fed to the boilers and the pressure under which the boilers are operating so that by properly proportioning the various parts the pen 36 may be made to record the equivalent evaporation upon the chart 9.

It is obvious that great variations may be made in the arrangements and proportions of the various parts of my invention. Either of the drums 14 and 37 of Figs. 1, 2 and 3 may be replaced by disks which may operate similar to the disks 93 and 110 of Figs. 4 and 5; the spirally wound wires or projections of the various members may be made in the form of grooves instead of as described while the engaging parts may be correspondingly altered to match; cams or wedge shaped, or conically shaped members or other devices may be used to transmit motion to record the desired result. The various parts are shown being assisted in their operation by gravity but it is obvious that any force may be used to move the various parts in any direction desired. It is further obvious that the device could be constructed with the member which I have shown as actuated in an upward direction by the operation of the water meter, in a stationary position up or down while the recording drum instead could be moved a corresponding amount to produce the desired record on the chart 9.

I do not confine the use of my invention to any particular fuel weighing or measuring machine or to the use of any particular fluid meter or fluid weighing machine as it will be obvious to those skilled in the art that any suitable fluid flow recorder of orifice, weir, Venturi or other type may be used and that any preferred fuel meter or fuel weighing machines may be used. In addition to the use of fuel and water meters, it is further obvious that the fuel or water may be weighed or measured by hand and the mechanism operated by hand as for example, by making contacts through the contact makers 26 and 48 to cause the desired record upon the recording chart.

In the drawings the record receiving means is shown as small in comparison with the other parts but it will be evident that suitable mechanism may be employed to enlarge the motion of the recording element in proportion to the other parts thereby permitting enlargement of the record receiving means and consequently of the record made thereon. It is evident that wide variations may be made within the scope of my invention and I do not confine myself to the constructions set forth and described.

What I claim as my invention and desire to protect by Letters Patent is:—

1. A device for recording the evaporation of a boiler comprising a record sheet, means for recording thereon, means operated in accordance with the amount of liquid evaporated to cause the recording means to record a higher value and means operated in accordance with the amount of fuel consumed to cause the recording means to record a lower value, whereby the record made upon the record sheet represents the evaporation of the boiler.

2. A device for indicating the evaporation of a boiler comprising a graduated member, means for indicating thereon, means operated in accordance with the amount of liquid evaporated to cause the indicating means to indicate a higher value and means operated in accordance with the amount of fuel consumed to cause the indicating means to indicate a lower value whereby the value indicated represents the evaporation of the boiler.

3. A device for indicating the evaporation of a boiler comprising a graduated member, means for indicating thereon, means operated in accordance with the amount of liquid evaporated to cause the indicating means to indicate a higher value, means operated in accordance with the amount of fuel consumed to cause the indicating means to indicate a lower value and means actuated by change of pressure within the boiler to alter the value indicated.

4. A device for indicating the evaporation of a boiler comprising a graduated member, means for indicating thereon, means operated in accordance with the amount of liquid evaporated to cause the indicating means to indicate a higher value, means operated in accordance with the amount of fuel consumed to cause the indicating means to indicate a lower value and means actuated by change of temperature of the liquid entering the boiler for altering the value indicated.

5. A device for indicating the evaporation of a boiler comprising a graduated member, means for indicating thereon, means operated in accordance with the amount of liquid evaporated to cause the indicating means to indicate a higher value, means operated in accordance with the amount of fuel consumed to cause the indicating means to indicate a lower value, means actuated by change of pressure within the boiler for altering the value indicated and means actuated by change of temperature of the liquid entering the boiler for altering the value indicated.

6. In a device for recording the evaporation of a boiler, a record sheet, means for recording thereon, means operated in accordance with the amount of liquid evaporated to cause the recording means to record a higher value and means operated in accordance with the amount of fuel consumed to cause the recording means to record a lower value.

7. In a device for indicating the evaporation of a boiler, a graduated member, means for indicating thereon, means operated in accordance with the amount of liquid evaporated to cause the indicating means to indicate a higher value and means operated in accordance with the amount of fuel consumed to cause the indicating means to indicate a lower value.

8. In a device of the character described, a record sheet, means for recording thereon, means operating to cause relative movement between the recording means and the record sheet in one direction with constantly decreasing increments and means operating to cause relative movement between the recording means and the record sheet in the opposite direction with constantly decreasing increments whereby the result of a mathematical calculation is recorded upon the record sheet.

9. In a device of the character described, a graduated member, means for indicating thereon, means operating to cause relative movement between the indicating means and the graduated member in one direction with constantly changing increments and means operating to cause relative movement between the indicating means and the graduated member in another direction with constantly changing increments whereby the result of a mathematical calculation is indicated upon the graduated member.

10. In a device of the character described, a graduated member, means for indicating thereon, means operating to cause relative movement between the indicating means and the graduated member in one direction with constantly decreasing increments and means operating to cause relative movement between the indicating means and the graduated member in another direction with constantly decreasing increments whereby the result of mathematical calculation is indicated upon the graduated member.

11. A device for indicating the evaporation of a boiler comprising a graduated member, means for indicating thereon, a revoluble member operated in accordance with the amount of liquid evaporated to cause the indication of a higher value and means operating in accordance with the amount of fuel consumed to shift said revoluble member with respect to the graduated member to cause the indication of a lower value whereby the value indicated represents the evaporation of the boiler.

12. A device for indicating the evaporation of a boiler comprising a graduated member, means for indicating thereon, means operated in accordance with the amount of liquid evaporated to cause relative movement between the graduated member and indicating means in one direction with constantly decreasing increments and means operated in accordance with the amount of fuel consumed to cause relative movement between the graduated member and indicating means in the opposite direction with constantly decreasing increments whereby the value indicated represents the evaporation of the boiler.

13. In an evaporation recorder, a graduated member, means for indicating thereon, a revoluble member adapted by its rotation to cause the indicating member to indicate a higher or lower value, a slidably mounted carriage for supporting the revoluble member and a second revoluble member adapted by its rotation to slide the carriage whereby an opposite value is indicated.

14. In an evaporation recorder, a graduated member, means for indicating thereon, a movable member adapted by its movement to cause the indicating means to indicate a value, a slidably mounted carriage for supporting the movable member and a second movable member adapted by its movement to slide the carriage whereby a different value is indicated.

15. A device for indicating the evaporation of a boiler comprising an indicating member, means operated in accordance with the amount of liquid evaporated to cause the indicating member to indicate a higher value and means operated in accordance with the amount of fuel consumed to cause the indicating member to indicate a lower value whereby the value indicated represents the evaporation of the boiler.

HARLEY C. ALGER.

Witnesses:
　IRVIN E. DISCHINGER,
　W. LAMAR WILLIAMS, Jr.